United States Patent
Marquis et al.

(10) Patent No.: US 7,171,869 B1
(45) Date of Patent: Feb. 6, 2007

(54) LEFT FOOT ACCELERATOR APPARATUS

(76) Inventors: Rebecca A. Marquis, 11604 Westwind Dr., Fort Wayne, IN (US) 46845; Kim Buchanan, 103 Greenway, Westville, IN (US) 46391

( * ) Notice: Subject to any disclaimer, the term of this patent is extended or adjusted under 35 U.S.C. 154(b) by 142 days.

(21) Appl. No.: 10/428,536

(22) Filed: May 2, 2003

(51) Int. Cl.
*G05G 1/16* (2006.01)

(52) U.S. Cl. ........................................ 74/562; 74/478.5

(58) Field of Classification Search .................. 74/478, 74/478.5, 479.01, 480 R, 512, 513, 560, 74/562, 562.5
See application file for complete search history.

(56) References Cited

U.S. PATENT DOCUMENTS

| | | | | |
|---|---|---|---|---|
| 2,444,342 A | * | 6/1948 | Edwards | 180/90.6 |
| 2,829,539 A | * | 4/1958 | Wilcox | 74/562.5 |
| 3,108,489 A | * | 10/1963 | Self | 74/562.5 |
| 3,199,369 A | * | 8/1965 | Kaal | 74/562.5 |
| 3,224,293 A | * | 12/1965 | De Rose | 74/562 |
| 3,224,294 A | * | 12/1965 | Gresham | 74/562.5 |
| 4,587,865 A | * | 5/1986 | Winner | 74/562.5 |
| 5,168,771 A | * | 12/1992 | Fujimori | 74/562.5 |
| 5,431,081 A | * | 7/1995 | Lombardi et al. | 84/422.1 |
| 6,079,687 A | * | 6/2000 | Calleia | 248/346.01 |
| 6,494,115 B1 | * | 12/2002 | Haugen et al. | 74/562 |

* cited by examiner

*Primary Examiner*—Chong H. Kim
(74) *Attorney, Agent, or Firm*—Krieg DeVault LLP

(57) ABSTRACT

A left foot accelerator apparatus comprises a shaft housing secured to the top surface of one end of an anchor plate, a shaft rotatably supported within the shaft housing and a left foot pedal moveably mounted to the shaft between a left end of the shaft and the shaft housing, the shaft operatively connecting the left foot pedal to an existing accelerator pedal in a vehicle.

25 Claims, 4 Drawing Sheets

LEFT FOOT ACCELERATOR APPARATUS

DETAILED DESCRIPTION OF EMBODIMENTS OF THE INVENTION

Figure 1:
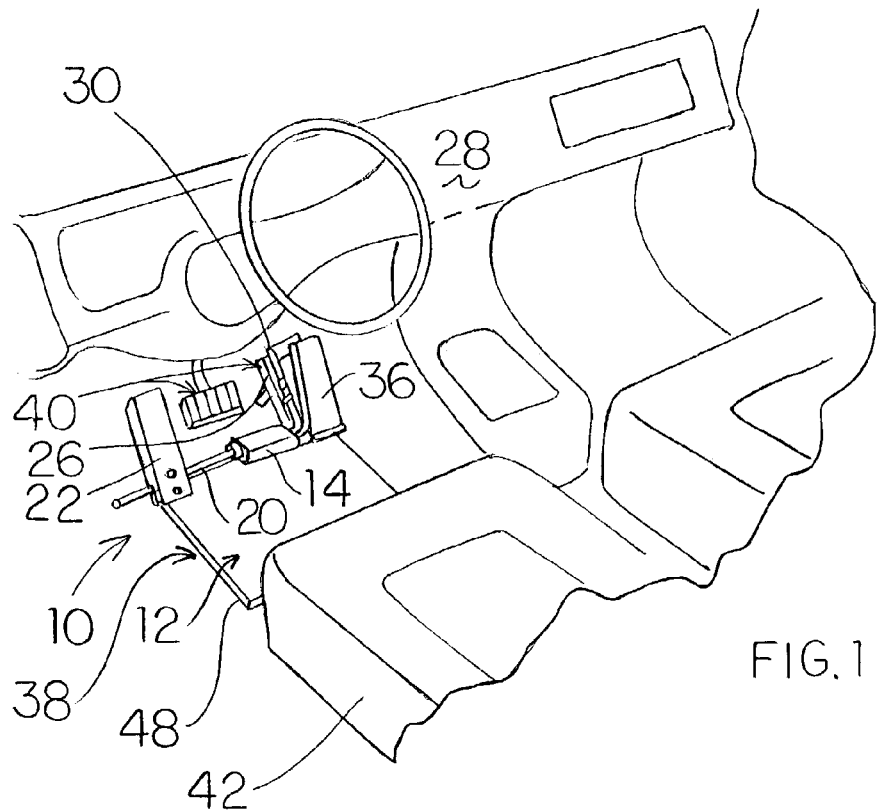
FIG. 1 is a perspective view of an embodiment of a left foot accelerator apparatus setting on a vehicle floor for operation.

Various embodiments of a left foot accelerator apparatus 10 are illustrated in FIGS. 1–5. As shown in FIG. 1, in one embodiment, the left foot accelerator apparatus 10 comprises an anchor plate 12 having a shaft housing 14 secured to its upper surface 16 at a front end 18 of the anchor plate, a shaft 20 rotatably supported by the shaft housing, and a left foot pedal 22 mounted on the shaft between its left end 24 and the shaft housing. The shaft 20 operatively connects the left foot pedal 22 to the existing accelerator pedal 26 in a vehicle 28, such as a car. In other embodiments, the apparatus 10 further comprises an accelerator actuator 30 secured to the right end 32 of the shaft 20. The accelerator actuator 30 has a distal end 34 that contacts the existing accelerator pedal 26 when the left foot pedal 22 is depressed. In other embodiments, the apparatus 10 further comprises a blocking pedal 36 secured to the shaft housing 14 in order to prevent operative contact to the existing accelerator pedal 26 other than by operation of the apparatus 10.

As shown in FIG. 1, the anchor plate 12 is configured to substantially cover the driver-side vehicle floor 38, generally between the existing pedals 40 in the vehicle 28 and the driver seat 42. The anchor plate 12 need not cover the entire driver-side vehicle floor 38, but rather only such amount of the driver-side vehicle floor 38 as to provide a substantially stable base support for the apparatus 10, or in other words to be frictionally engaged to the driver-side vehicle floor 38 such that the apparatus 10 is essentially stable or immovable during operation so as to avoid any need to secure the anchor plate 12 to the vehicle floor 38.

Figure 3:
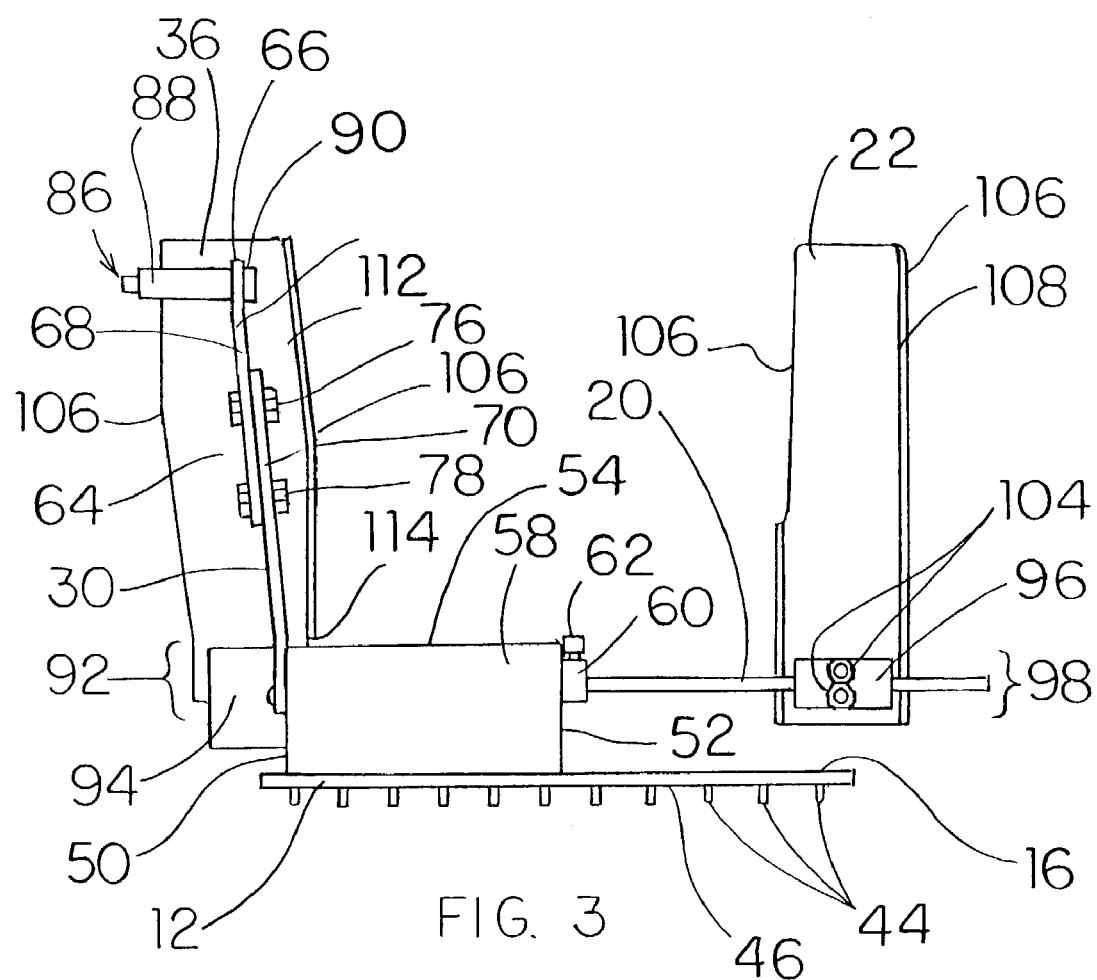
FIG. 3 is a front view of an embodiment of a left foot accelerator apparatus.

As shown in FIG. 3, in one embodiment, the anchor plate 12 comprises a plurality of pins 44 extending downwardly from a bottom surface 46 of the anchor plate. The pins 44 are adapted to frictionally engage flooring material 48, such as carpeting, covering the driver-side vehicle floor 38. In other embodiments, the pins 44 extend downwardly between about 1/16 inch and about 3/4 inch.

The weight of the anchor plate 12 may assist in providing a substantially stable base support that does not require securement to the vehicle floor 38. In one embodiment, the anchor plate 12 is between about four pounds and about twenty pounds. In other embodiments, the anchor plate 12 is manufactured of a metal material. In yet other embodiments, the metal material is between about one-eighth inch thick and about one inch thick. In all embodiments, the weight of the anchor plate 12 is adjusted by varying the thickness or material of plate 12. In yet other embodiments, the anchor plate 12 is between about ten inches and about sixteen inches wide, and between about ten inches and about sixteen inches long.

As shown in the drawings, the shaft housing 14 is secured to the front end 18 of the anchor plate 12. In one embodiment, securement is by welding. The shaft housing 14 generally has a right side 50, left side 52, top 54, front 56 and back 58. The shaft 20 is rotatably supported within the shaft housing 14, extending transversely and generally outwardly from the left side 52 and the right side 50.

Figure 2:
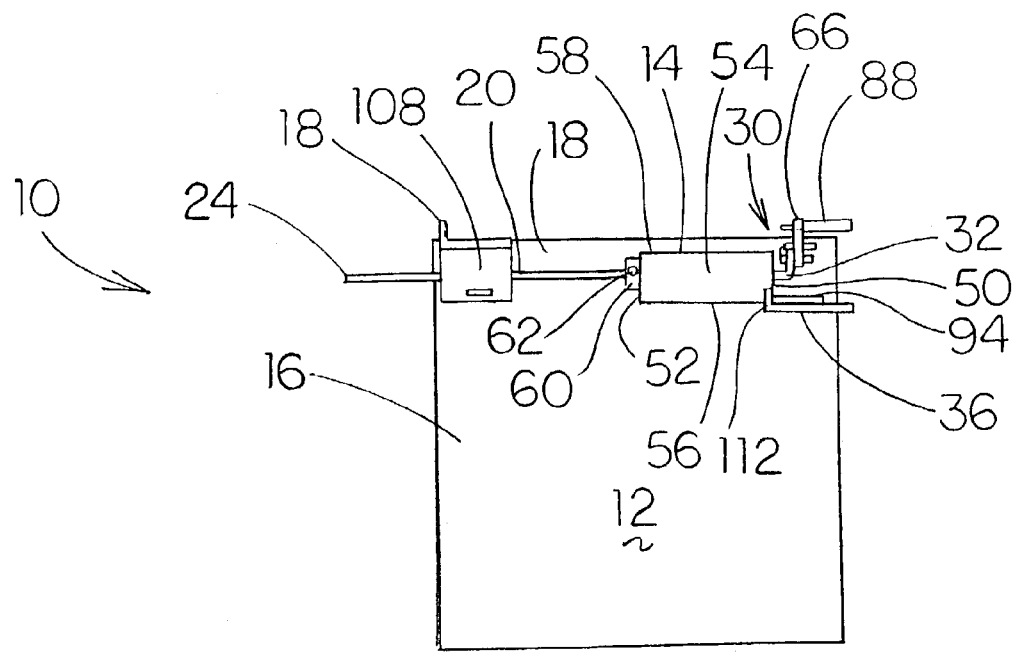
FIG. 2 is a top view of an embodiment of a left foot accelerator apparatus.

In one embodiment, the apparatus 10 comprises an annular collar 60 mounted to the shaft 20 as shown in FIGS. 2–3. The annular collar 60 is secured to the shaft 20 between the left foot pedal 22 and the left side 52 of the shaft housing 14. In other embodiments, the annular collar 60 is configured to slideably receive the shaft 20 therethrough, has a radial set screw 62 that is configured to frictionally engage the shaft 20 within the annular collar 60 to releaseably secure the position of the annular collar on the shaft 20. In other embodiments, the annular collar 60 is adapted to be mounted and releaseably fixed by the radial set screw 62 at a position generally immediately adjacent to the left side 52 in order to frictionally engage the left side to substantially prevent the shaft 20 from rightward lateral movement relative to the shaft housing 14.

Figure 4:
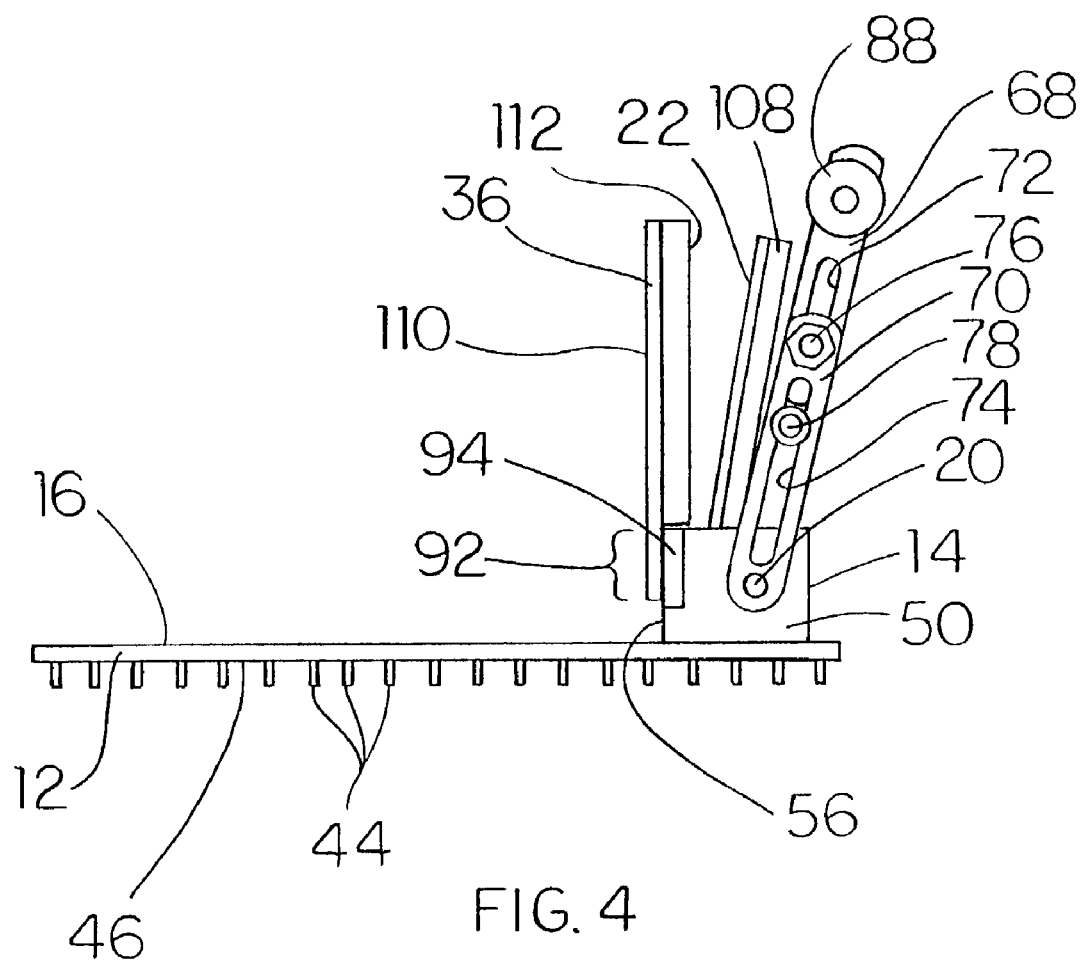
FIG. 4 is a side view of an embodiment of a left foot accelerator apparatus.

In one embodiment, as shown in FIGS. 3 and 4, the left foot pedal 22 is operatively connected by the shaft 20 to the existing accelerator pedal 26 as a result of an accelerator actuator 30 secured to the right end 32 of the shaft. In other embodiments, the accelerator actuator 30 comprises an arm 64 having a distal end 66 configured to operatively contact the existing accelerator pedal 26. In operation, when the left foot pedal 22 is depressed, the shaft 20 rotates within the shaft housing 14 causing the arm 64 at the right end 32 to rotate toward the existing accelerator pedal 26, which is operatively contacted by the distal end 66. In yet other embodiments, the accelerator actuator 30 is configured to frictionally engage the right side 50 to substantially prevent the shaft 20 from leftward lateral movement relative to the shaft housing 14.

Figure 5:
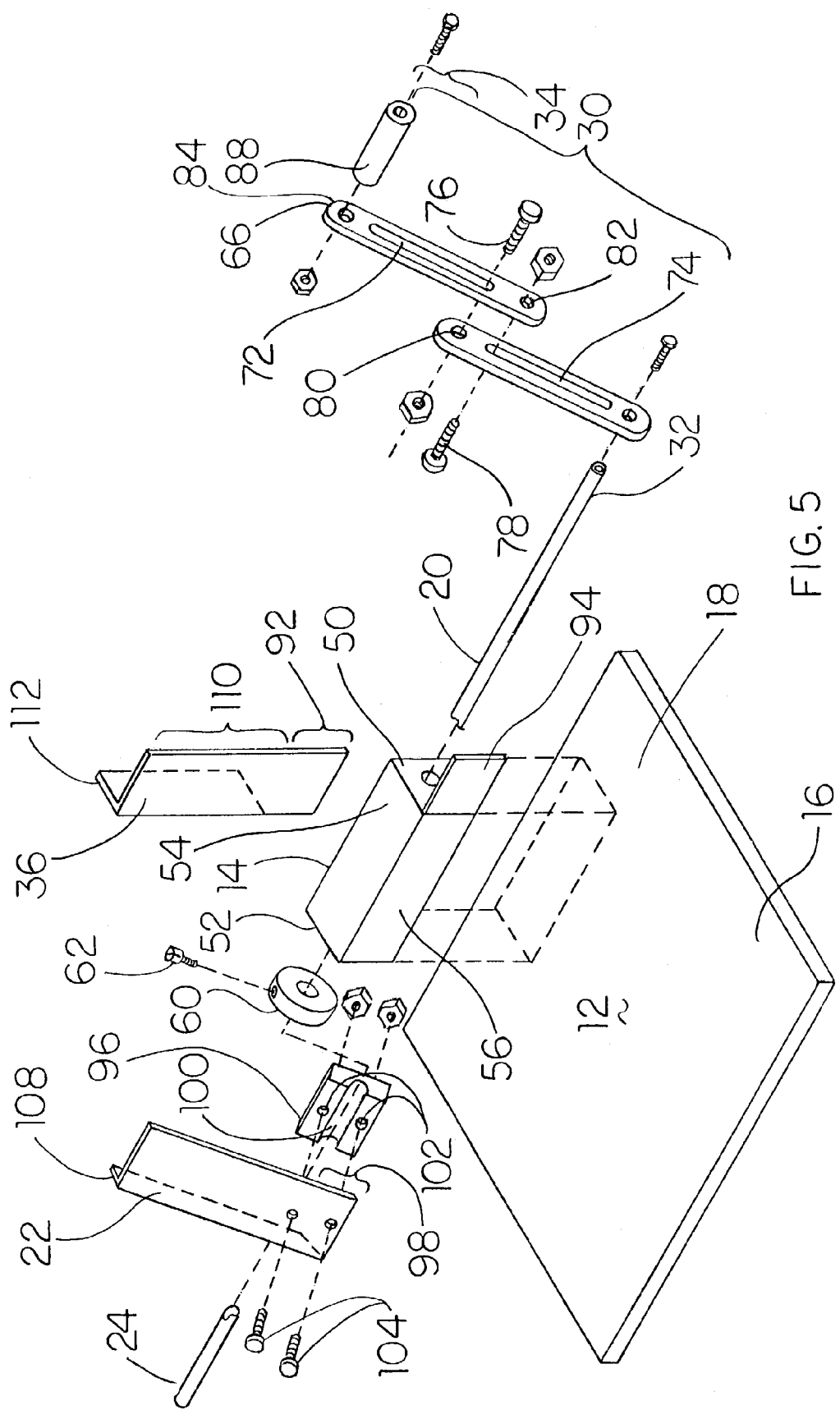
FIG. 5 is an exploded perspective view of an embodiment of a left foot accelerator apparatus.

As shown in FIGS. 3–5, the arm 64 in one embodiment comprises an upper arm 68 and a lower arm 70 that are cooperatively engaged to permit adjustments in the length of the arm. In other embodiments, each of the upper and lower arms 68, 70 comprise elongated slots 72, 74 that slideably engage adjustable cams 76, 78 that are generally fixedly engaged within apertures 80, 82 in the upper and lower arms 68, 70. The upper arm 68 comprises the upper elongated slot 72 and the lower aperture 82, and the lower arm 70 comprises the lower elongated slot 74 and the upper aperture 80.

In one embodiment, the first adjustable cam 76 is slideably engaged within the lower elongated slot 74 and generally fixedly engaged within the upper aperture 80. The second adjustable cam 78 is slideably engaged within the upper elongated slot 72 and generally fixedly engaged within the lower aperture 82. In other embodiments, the lower arm 70 is fixedly secured to the right end 32 of the shaft 20. In yet other embodiments, the upper arm 68 comprises the distal end 66 of the arm 64 at an upper end 84 thereof.

As shown in FIG. 3, in one embodiment, the distal end 66 of the arm 64 comprises a transversely extending contact stem 86. In other embodiments, the contact stem 86 comprises a roller 88 having one end 90 rotatably secured to the arm 64. In yet other embodiments, the roller 88 is manufactured of rubber or high-density polyethylene plastic materials.

In one embodiment of the present invention, a blocking pedal 36 is secured to the shaft housing 14 adjacent to the front 56 thereof at the right side 50. In other embodiments, the blocking pedal 36 is configured to prevent any operative contact to the accelerator actuator 30 and/or the existing accelerator pedal 26 other than by operation of the apparatus 10. In yet other embodiments, the blocking pedal 36 is secured at a lower portion 92 thereof to a generally planar ear 94 extending from the front 56 of the shaft housing 14 laterally beyond the right side 50. Securement of the lower portion 92 to the ear 94 may be by one or more fasteners or by welding.

The left foot pedal 22 in one embodiment is movably mounted on the shaft 20. The left foot pedal 22 is generally located on the shaft 20 between the left end 24 and the shaft housing 14. In other embodiments, the left foot pedal 22 is movably mounted to the shaft 20 by a clamp 96 connected to a lower end 98 of the left foot pedal 22. The shaft 20 transversely extends between the clamp 96 and the left foot pedal 22. In yet other embodiments, the clamp 96 comprises a groove 100 configured to receive a portion of the shaft 20. At least one aperture 102 is provided through the clamp 96 adjacent to the groove 100 for releaseably receiving a fastener 104 extending from the lower end 98 of the left foot pedal 22.

In order to augment the rigidity of the left foot pedal 22 and the blocking pedal 36, in one embodiment, these are manufactured of metal materials. In other embodiments, at least one lateral edge 106 of the left foot pedal 22 and/or the blocking pedal 36 is bent generally toward the existing pedals 40 of a vehicle 28 as the apparatus 10 sits in position for operation. Bending of a lateral edge 106 in this way provides a generally L-shaped horizontal cross-section of the left foot pedal 22 and/or blocking pedal 36, or U-shaped if both lateral edges are so bent. In yet other embodiments, the left foot pedal 22 comprises a left edge 108 that is so bent. In yet other embodiments, the blocking pedal 36 comprises an upper portion 110 above the lower portion 92 secured to the ear 94, the upper portion 110 having a left edge 112 that is so bent. In yet other embodiments, the left edge 112 of the upper portion 110 further comprises a bottom face 114 that is configured to engage and rest upon the top 54 of the shaft housing 14 to substantially prevent movement of the blocking pedal 36 relative to the shaft housing 14.

In operation, the apparatus 10 is placed on the driver-side floor 38 of the vehicle 28 as shown in FIG. 1. Because the anchor plate 12 does not require being secured to the vehicle floor 38, the apparatus 10 may be removed from one vehicle and placed in another vehicle with relative ease. A user (not shown) of the apparatus 10 positions it so that the accelerator actuator 30 is aligned with the existing accelerator pedal 26. In one embodiment, the apparatus 10 is positioned so that the distal end 66 of the accelerator actuator 30 contacts or is almost in contact with the existing accelerator pedal 26 while it is in its substantially distended position, i.e., substantially at idle position. The left foot pedal 22 may then be positioned on the shaft 20 as desired by the user for comfortable operation of the apparatus 10. In order to utilize the existing accelerator pedal 26, the user depresses the left foot pedal 22 which rotates the shaft 20. At the right end 32 of the shaft 20, the accelerator actuator 30 is caused to rotate in the same direction that the left foot pedal 22 is depressed, causing the distal end 66 to operatively contact and depress the existing accelerator pedal 26. In other embodiments, the blocking pedal 36 prevents the user from unintentionally contacting the accelerator actuator 30 or the existing accelerator pedal 26 with the right foot or other body part or object.

While specific embodiments of the invention have been shown and described herein for purposes of illustration, the protection offered by any patent which may issue upon this application is not strictly limited to the disclosed embodiments; but rather extends to all structures, steps and arrangements which fall fairly within the scope of the claims which are appended hereto.

What is claimed is:

1. A left foot accelerator apparatus, comprising: a generally flat anchor plate, a shaft housing, a shaft and a left foot pedal, said anchor plate being configured to over lay a driver side vehicle floor between existing pedals in a vehicle and a driver seat, said anchor plate frictionally engaging said driver side vehicle floor such that said left foot accelerator apparatus is immovable relative to said driver side vehicle floor without the use of any bolts or fasteners to further secure said left foot accelerator apparatus to said driver sided vehicle floor, said left foot accelerator apparatus being transferable from vehicle to vehicle when said anchor plate is lifted and disengaged from said driver side vehicle floor, said anchor plate having a front end adjacent said existing pedals and top and bottom surfaces, said shaft housing fixedly secured to said top surface of said anchor plate at said front end, said shaft housing rotatably supporting said shaft, said shaft housing having left and right sides, a top, a front and a back, said shaft having a left end and a right end, said left foot pedal being movably secured on said shaft between said left end and said shaft housing, said shaft operatively connecting said left foot pedal to an existing accelerator pedal in said vehicle, whereby said left foot accelerator apparatus may be moved from vehicle to vehicle by merely picking up said left foot accelerator apparatus from the driver side vehicle floor and placing the same in another vehicle leaving the vehicle from which the left foot accelerator apparatus was removed totally unencumbered by any base plates, bolts, bolt holes, fasteners, fastener holes, or other structure.

2. The accelerator apparatus of claim 1 wherein said anchor plate comprises a plurality of pins extending downwardly from said bottom surface, said pins adapted to frictionally engage flooring material covering said driver side vehicle floor.

3. The accelerator apparatus of claim 1 wherein said anchor plate weighs between about 4 pounds and about 20 pounds.

4. The accelerator apparatus of claim 1 wherein said anchor plate is manufactured of a metal material.

5. The accelerator apparatus of claim 4 wherein said metal material is between about 1/8 inch thick and about 1 inch thick.

6. The accelerator apparatus of claim 1 wherein said anchor plate is between about 10 inches and about 16 inches wide and between about 10 inches and about 16 inches long.

7. The accelerator apparatus of claim 2 wherein said pins extend downwardly from said bottom surface between about 1/16 inch and about 3/4 inch.

8. The accelerator apparatus of claim 1 wherein said shaft extends through said shaft housing from said left side to said right side, said apparatus further comprising an annular collar mounted to said shaft between said left foot pedal and said left side, said annular collar configured to slideably receive said shaft therethrough, said annular collar having a set screw configured to frictionally engage said shaft within said annular collar, said annular collar being adapted to be mounted immediately adjacent said left side and frictionally engage said left side to prevent said shaft from rightward lateral movement relative to said shaft housing.

9. The accelerator apparatus of claim 1 further comprising an accelerator actuator secured to said right end of said shaft.

10. The accelerator apparatus of claim 9 wherein said accelerator actuator comprises an arm having a distal end configured to operatively contact said existing accelerator pedal.

11. The accelerator apparatus of claim 10 wherein said arm comprises an upper arm having an upper elongated slot and a lower aperture, and a lower arm having a lower elongated slot and an upper aperture, said upper and lower elongated slots cooperating to permit adjustments in the length of said arm.

12. The accelerator apparatus of claim 11 wherein said upper and lower elongated slots cooperate about first and second adjustable cams, said first cam being slideably engaged within said lower elongated slot and fixedly engaged within said lower aperture, said second cam being slideably engaged within said upper elongated slot and generally fixedly engaged within said upper aperture.

13. The accelerator apparatus of claim 11 wherein said lower arm is fixedly secured to said right end of said shaft.

14. The accelerator apparatus of claim 9 wherein said accelerator actuator is configured to frictionally engage said right side of said shaft housing to prevent said shaft from leftward lateral movement relative to said shaft housing.

15. The accelerator apparatus of claim 1 further comprising a blocking pedal secured to said shaft housing adjacent said front at said right side.

16. The accelerator apparatus of claim 15 wherein said blocking pedal is configured to prevent any operative contact with said existing accelerator pedal other than by operation of said apparatus.

17. The accelerator apparatus of claim 15 wherein said blocking pedal is secured at a lower portion to a generally planar ear extending from said front laterally beyond said right side.

18. The accelerator apparatus of claim 17 wherein an upper portion of said blocking pedal above said lower portion comprises a left edge bent generally toward said existing pedals to provide a generally L-shaped horizontal cross section of said upper portion.

19. The accelerator apparatus of claim 18 wherein said left edge comprises a bottom face adjacent said lower portion, said bottom face configured to rest on said top of said shaft housing to substantially prevent movement of said blocking pedal relative to said shaft housing.

20. The accelerator apparatus of claim 1 wherein said left foot pedal is moveably mounted on said shaft by a clamp connected to said left foot pedal at a lower end, said shaft transversely extending between said clamp and said left foot pedal.

21. The accelerator apparatus of claim 20 wherein said clamp comprises a groove configured to receive a portion of said shaft, and at least one aperture through said clamp adjacent said groove, said aperture configured to releaseably receive a fastener extending from said left foot pedal.

22. The accelerator apparatus of claim 1 wherein said left foot pedal comprises a left edge substantially bent generally toward said existing pedals to provide a generally L-shaped horizontal cross section of said left foot pedal.

23. The accelerator apparatus of claim 10 wherein said distal end of said accelerator actuator arm comprises a transversely extending contact stem.

24. The accelerator apparatus of claim 23 wherein said contact stem comprises a roller.

25. The accelerator apparatus of claim 24 wherein said roller is manufactured of rubber or high density polyethylene plastic materials.

* * * * *